United States Patent [19]

Odaka

[11] 4,451,921
[45] May 29, 1984

[54] PCM SIGNAL PROCESSING CIRCUIT

[75] Inventor: Kentaro Odaka, Tokyo, Japan

[73] Assignee: Sony Corporation, Tokyo, Japan

[21] Appl. No.: 289,970

[22] Filed: Aug. 4, 1981

[30] Foreign Application Priority Data

Aug. 6, 1980 [JP] Japan .............................. 55-107937

[51] Int. Cl.³ .................... G06F 11/00; G06F 11/26
[52] U.S. Cl. ........................................ 371/48; 371/6; 371/31
[58] Field of Search ................. 371/6, 25, 28, 31, 38, 371/40, 41, 48, 53, 67, 72

[56] References Cited

U.S. PATENT DOCUMENTS

| 3,568,147 | 3/1971 | Gilson | 371/31 |
|---|---|---|---|
| 3,671,935 | 6/1972 | Lipp et al. | 371/67 |
| 3,757,112 | 9/1973 | Lehmann | 371/67 |
| 4,054,863 | 10/1977 | Goodman et al. | 371/31 |
| 4,163,209 | 7/1979 | McRae | 371/6 |
| 4,188,615 | 2/1980 | Tan | 371/48 |
| 4,224,689 | 9/1980 | Sundberg | 371/6 |
| 4,234,954 | 11/1980 | Lange et al. | 371/6 |
| 4,367,550 | 1/1983 | Douverne | 371/6 |

OTHER PUBLICATIONS

Electronic Industries Association of Japan, Technical File of Stereo Technical Committee, Video Technical Committee STC-007, Consumer Use PCM Encoder-Decoder, 6/79, pp. 1–14.

Primary Examiner—Jerry Smith
Assistant Examiner—Gary V. Harkcom
Attorney, Agent, or Firm—Hill, Van Santen, Steadman & Simpson

[57] ABSTRACT

A pulse code modulation signal processing circuit, for example, for an audio recording and reproducing apparatus to be used with a video tape recorder wherein errors occurring in the pulse code modulated signals are detected by serially providing incoming pulse code modulated data words to serially connected shift registers which are, respectively, adapted to store one word. The outputs of the first and third register are added and divided by two and this divided output is added with the inverted output of the second shift register and the results are compared with a reference signal to determine a one or zero. The one indicates that there is an error in one of the words and the zero indicates that there is no error. The ones or zeros from the comparing circuit are stored in three serially connected one bit shift registers which are timed with the data receiving shift registers and if a one occurs in any of the second shift registers an interpolation circuit is utilized to interpolate the output serial connected words from the first three shift registers. When the second shift register does not contain any ones, but contain only zeros, then it is known that the signals in the first three serially connected shift registers are correct.

6 Claims, 2 Drawing Figures

|     | $W_3$ | $W_2$ | $W_1$ | $b_3$ | $b_2$ | $b_1$ |
|-----|-------|-------|-------|-------|-------|-------|
| $t_1$ | × | ○ | ○ | 1 | 0 | 0 |
| $t_2$ | ○ | × | ○ | 1 | 1 | 0 |
| $t_3$ | ○ | ○ | × | 1 | 1 | 1 |
| $t_4$ | ○ | ○ | ○ | 0 | 1 | 1 |
| $t_5$ | ○ | ○ | ○ | 0 | 0 | 1 |
| $t_6$ | ○ | ○ | ○ | 0 | 0 | 0 |

PCM SIGNAL PROCESSING CIRCUIT

BACKGROUND OF THE INVENTION

1. Field of the Invention

This invention relates to a PCM signal processing circuit. More particularly, this invention relates to a processing circuit which is suitable for an audio PCM recording/reproducing apparatus using a VTR or the like as a medium. PCM in this application means pulse code modulation. VTR in this application means video tape recorder.

2. Description of the Prior Art

In an apparatus wherein a coded audio signal (PCM signal) is recorded and reproduced by a VTR or the like, in general, signal processing is accomplished to prevent the occurrence of auditory problems, for example, through signal correction by incorporating an error-detecting code or error-correcting code to prevent erroneous reading when reproducing signals from the recording medium. However, in case signal drop-outs are frequent in the reproduced signals, processing using such error-detecting code or error-correcting code becomes incomplete, allowing click noises to be generated. If a hand-cut editing is utilized, the data become discontinuous at the seams of the tape, which also causes click noises. Particularly when a delay type data interleave is applied to data during recording for reducing the percentage of defective read during reproduction, if a hand-cut editing is done, the sequence of interleave will be disordered and the reproduction of data no longer will be possible, thus resulting in noisy reproduction of sound which lasts over both sides of the tape seam. Also in a different speed reproducing mode there sometimes occurs noise which is attributable to a disordered sequence of the data interleaves.

SUMMARY OF THE INVENTION

It is therefore an object of this invention to provide a PCM signal precessing circuit which eliminates the foregoing drawbacks.

It is another object of this invention to provide a PCM signal processing circuit wherein, when an erroneous data is detected, an interpolation is made for that data and also for the data of several words before and behind that data thereby preventing the occurrence of click noises in the reproduced audio signal at the time of editing, special speed-varied reproducing, etc.

Other objects, features and advantages according to the present invention will become apparent during the course of the description which follows.

DESCRIPTION OF THE PREFERRED EMBODIMENTS

Figures 1, 2:
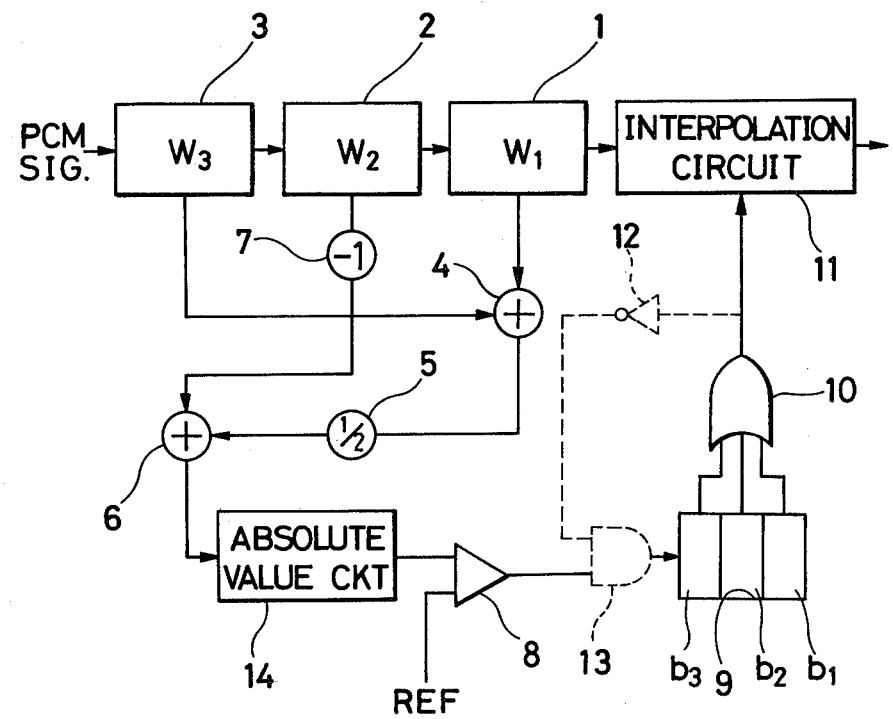
FIG. 1 is a block diagram of a processing circuit for a reproduced PCM signal according to an embodiment of this invention.
FIG. 2 is a chart for illustrating the operation of the processing circuit of FIG. 1.

FIG. 1 is a block diagram of a processing circuit for a reproduced PCM signal according to an embodiment of this invention. Data which have been read as audio PCM signals and subjected to error-detecting and error-correcting processing are successively stored in one-word registers (1), (2) and (3). One word consists of PCM data of L and R channels and an error-correcting code. By supplying the contents $W_1$ and $W_3$ of the registers (1) and (3) respectively to an adder (4) there is obtained $W_1+W_3$. The result of the addition is fed to a ½ divider (5) where there is performed the calculation of $(W_1+W_3)/2$. The result of the division is fed to an adder (6), where it is added to a signal $-W_2$ which has been obtained by inverting the polarity of the contents $W_2$ of the register (2) through an inverter (7).

The output of the adder (6) is the difference between a predicted value for $W_2$ predicted by the data $W_1$ and $W_3$ and the actual data $W_2$. It is fed to an absolute value circuit (14) where there is obtained an absolute value of the difference, i.e. $|(W_1+W_3)/2-W_2|$. The output of the absolute value circuit (14) is fed to a comparator (8) where it is compared with a reference level signal REF and if $$|(W_1+W_3)/2-W_2|<\text{REF} \tag{1}$$

it is judged that there is no error. If the comparison result is the opposite, it is judged that any of the data $W_1$ through $W_3$ is different from the true data, and a highlevel output is generated in the comparator (8) to be fed to a register (9).

The register (9), which is, a 3-bit register, shifts its input at every word timing and outputs $b_1$, $b_2$ and $b_3$ thereof are fed as control signals to an interpolation circuit (11) through an OR gate (10). Consequently, once an error is detected, the succeeding two words are also regarded as errors and there is performed interpolation of the data output of the register (1).

FIG. 2 is a chart for illustrating the operation of the processing circuit of FIG. 1. If a bad data $W_3$ enters the register (3) at time $t_1$, an error is detected by the linear prediction circuit (4)-(8) and a "1" enters the bit $b_3$ of the register (9). In this case, the data of two words ahead, i.e. data $W_1$, is regarded as an error and the data output $W_1$ of the register (1) is interpolated in the interpolation circuit (11). Next, when at time $t_2$ the bad data moves to $W_2$ and at the same time a good data enters $W_3$, the $W_1$ is again regarded as an error and it is interpolated. In this state, the inclusion of an erroneous data is detected on the basis of the linear prediction of the equation (1) and a "1" is written in the bit $b_3$ of the register (9). In the bit $b_2$ there is shifted a "1", the result of the preceding error detection. Likewise, also at time $t_3$ there is detected an error on the basis of the equation (1) and the data $W_1$ is interpolated. In this state, the contents of the register (9) are all "1".

At times $t_4$ and $t_5$ the contents of the registers (1) through (3) all become good data, but it is regarded that the error still continues, and interpolation is performed until the contents of the register (9) all become "0". That is, when there was detected an error at time $t_3$, it can also be regarded that the data $W_3$ is in error, and therefore the interpolation is continued until this data reaches the register (1). At time $t_6$, the data $W_1$ through $W_3$ are all good data and the bits $b_1$ through $b_3$ are all "0"S, so that interpolation is not performed.

In general, the number of the error detecting registers (1) through (3) should be decided according to how many words continue which are auditory harmful data caused by an overlook etc. during the processing with error-detecting and error-correcting bits. For example, if it is possible that there will occur erroneous data continuously for x words, the number of data n necessary for the error detection, namely the number of detecting registers, should be set as follows:

$$n \geq 2x \qquad (2)$$

otherwise there is the possibility of an erroneous detection since the number of erroneous data predominates over the number of correct data. For example, if $(W_3, W_2, W_1) = (X X O)$ in FIG. 1, bad data X predominates, and at the time of the linear prediction it is substantially detected on the basis of the bad data that good data are spaced far apart from the bad data. Thus in the linear prediction, the relation between good and bad data is reversed, so that the probability of erroneous operation for bad data detection increases. In this case, therefore, it is necessary to set the number of detecting data at 4 or more so that good data predominates numerically. In the embodiment shown in FIG. 1, the number of continuous error data is set as $x=1$, for which the number of the detecting data is set as $n=3$.

Instead of increasing the number of detected data, there may be adopted a system such that a longer register (9) of FIG. 1 is provided whereby once an error is detected, the succeeding data are also regarded as bad data, and interpolation is continued regardless of the detection of errors.

A modification may be provided as shown with a dotted line in FIG. 1, in which when the output of the OR gate (10) became "1", the output signal may be inverted by an inverter (12) and with this inverted signal an AND gate (13) positioned between the comparator (8) and the register (9) may be closed to prohibit the output of the comparator (8) from being supplied to the register (9). Alternatively, the operation of the prediction circuit (4)-(8) may be prohibited with the output of the inverter (12).

The number of continuations of error data in the case of hand-cut editing of recorded tape can be predicted from the manner in which the data are interleaved upon recording. For example, with respect to data $L_{3n}$, $L_{3n+1}$ and $L_{3n+2}$ in one block (one horizontal period) consisting of three words, if the following interleave operation is applied to a horizontal period $H_n$:

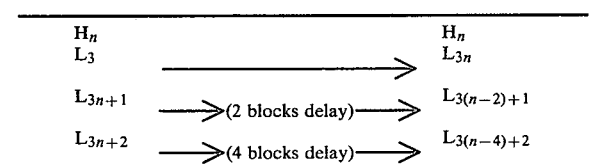

there is formed the following interleaved data A:

|     | $H_0$  | $H_1$  | $H_2$  | $H_3$ |
|-----|--------|--------|--------|-------|
|     | $L_0$  | $L_3$  | $L_6$  | $L_9$ |
|     |        | $L_{-2}$ | $L_1$ | $L_4$ |
|     | $L_{-7}$ | $L_{-4}$ | $L_{-1}$ |     |

And if another data B is added by a hand-cut editing of the tape, following interleave data is formed:

| Data A |       |       |       | Data B |       |       |
|--------|-------|-------|-------|--------|-------|-------|
| $H_0$  | $H_1$ | $H_2$ | $H_3$ | $H_6$  | $H_7$ | $H_8$ |
| $L_0$  | $L_3$ | $L_6$ | $L_9$ | $L_{18}$ | $L_{21}$ | $L_{24}$ |
|        | $L_{-2}$ | $L_1$ | $L_4$ | $L_{13}$ | $L_{16}$ | $L_{19}$ |
| $L_{-7}$ | $L_{-4}$ | $L_{-4}$ |    | $L_8$  | $L_{11}$ | $L_{14}$ | $L_{17}$ |

If this interleaved data is deinterleaved, the result becomes as follows:

| $L_0$ | $L_1$ | $L_8$ | $L_3$ | $L_4$ | $L_{11}$ | $L_6$ | $L_{13}$ | $L_{14}$ | $L_9$ | $L_{16}$ |
|-------|-------|-------|-------|-------|----------|-------|----------|----------|-------|----------|
|       |       | X     |       |       | X        |       | X        | X        |       |          |

Thus, as a result of a hand-cut editing of the tape, it no longer is possible to effect a complete deinterleave of data, and there even occur two consecutive errors of data such as X X shown above. In general, the interleaving method is more complicated, and the number of continuous error data further increases. Thus, the number of data n required for linear prediction of the equation (2) can be determined in terms of probabilities on the basis of how to interleave the data.

In this invention, as hereinbefore described, erroneous data is detected from among coded data of plural words with a linear prediction method, and interpolation of data is performed during several word periods before and behind this erroneous data according to a predetermined probability of occurrence of error. Therefore, even if errors are overlooked in signal processing with an error-detecting or -correcting bits affixed to each data, it is possible to detect and interpolate abnormal data. Consequently, in case this invention is applied to audio PCM signals, a complete correction can be made even for signals including a lot of drop-outs or for signals wherein the sequence of interleave has been disordered as a result of hand-cut editing of the tape, and the reproduced sound is free from click noises or the like.

Although the illustrative embodiment of the invention has been described in detail herein with reference to the accompanying drawings, it is to be understood that the invention is not limited to the precise embodiment, and that various changes and modifications can be effected therein by one skilled in the art without departing from the scope and spirit of the invention as defined in the appended claims.

What is claimed is:

1. A pulse code modulation signal processing circuit for detecting errors in pulse code modulated signal words, the detected errors being used to control an associated interpolation circuit for correcting these errors comprising:

a first shift register capable of storing plural data words having a series input terminal, a series output terminal, and plural parallel output terminals, said first shift register receiving at its series input terminal a pulse code modulated signal structured into successive data words, said first shift register series output terminal being connected in series to an input terminal of an interpolation circuit, which subsequently corrects errors in data words outputted from said first shift register upon operation of said interpolation circuit;

a detection circuit connected to said plural parallel output terminals of said first shift register for detecting a data error in at least one data word stored in said first shift register by comparing data contained in said stored plural data words in said first shift register by using a linear prediction method, said detection circuit further outputting a discrete signal indicating whether or not an error is present in said one data word in said first shift register;

a second shift register connected to the output of said detection circuit having the capacity for storing plural designation bits, each designation bit corresponding to a designated data word in said first shift register, said second shift register receiving said discrete output signal from said detection circuit and shifting one designation bit position each time said discrete output signal is received;

a control circuit connected to parallel outputs of said second shift register and to said interpolation circuit, said control circuit turning on said interpolation circuit whenever any one of said plural designation bits stored in said second shift register indicates data word error, and turning off said interpolation circuit whenever none of the plural designation bits stored in said second shift register indicates data word error.

2. A pulse code modulation signal processing circuit according to claim 1, wherein said detection circuit includes a prediction circuit for predicting the data value of one data word on the basis of data before and after said one data word and comprises a circuit for calculating the difference between the predicted data value obtained from said prediction circuit and the actual data value and a circuit for determining the absolute value of said difference, and a circuit for comparing said absolute value with a reference value, said discrete error detecting signal being obtained from said comparison circuit.

3. A pulse code modulation signal processing circuit according to claim 2, wherein said prediction circuit is a mean value circuit.

4. A pulse code modulation signal processing circuit according to claim 1, wherein said control circuit is a gate circuit which ORs the parallel outputs of said second shift register.

5. A pulse code modulation signal processing circuit according to claim 1, wherein the number of words n of said first shift register is set to $n \geq 2x$ when it is predicted that erroneous data will be produced continuously in x words and where n is an integer.

6. A pulse code modulation signal processing circuit according to claim 1, characterized by further including gate means for disconnecting the output of said detection circuit to said second shift register based on the output of said control circuit.

* * * * *